UNITED STATES PATENT OFFICE.

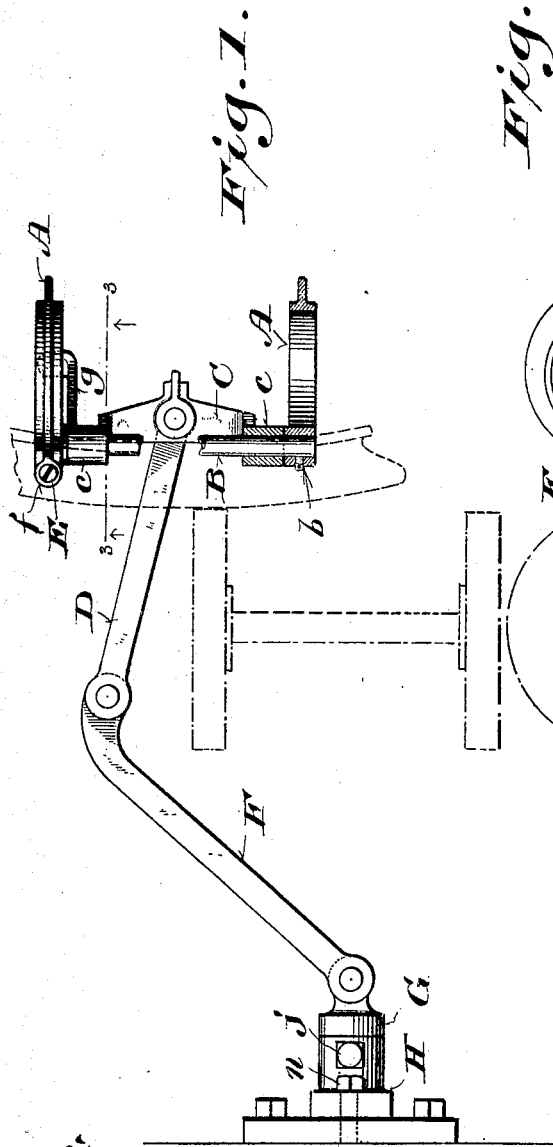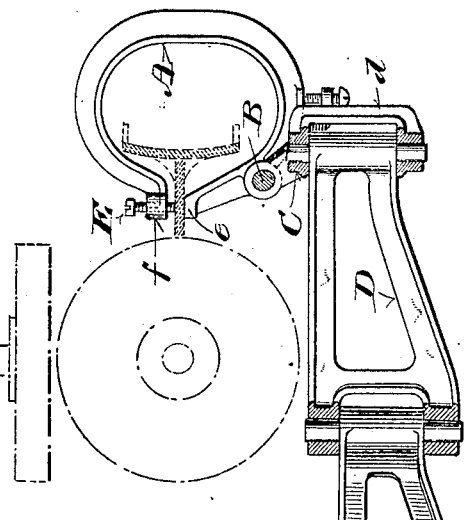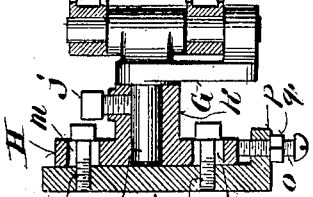

JAMES M. THOMPSON, OF MILWAUKEE, WISCONSIN, ASSIGNOR TO LUTHER BROS. CO., OF MILWAUKEE, WISCONSIN.

CLAMPING MECHANISM.

No. 912,757.  Specification of Letters Patent.  Patented Feb. 16, 1909.

Application filed January 24, 1908. Serial No. 412,399.

*To all whom it may concern:*

Be it known that I, JAMES M. THOMPSON, a citizen of the United States, and resident of Milwaukee, in the county of Milwaukee and State of Wisconsin, have invented certain new and useful Improvements in Clamping Mechanism; and I do hereby declare that the following is a full, clear, and exact description thereof.

The invention has for its object to facilitate grinding of skate-runners, and it consists of a simple, economical and efficient mechanism comprising a suitable clamp and an oscillative expansile and contractile radius carrier with which the clamp has oscillative connection, the carrier being attachable to any suitable support and provision had for adjustments of said carrier to properly aline a clamped skate-runner with a rotary grinding-wheel; said invention being hereinafter more particularly set forth with reference to the accompanying drawings and also hereinafter claimed.

Figure 1 of the drawings represents a plan view partly in horizontal section of a skate-runner clamp and carrier for same in accordance with my invention, a clamped skate and grinding-wheels being illustrated by dotted lines in the same figure, Fig. 2, a partly sectional side elevation of what is shown in Fig. 1, and Fig. 3, a side elevation of a fragment of the clamp partly in section on the plane indicated by line 3—3 in said Fig. 1.

Referring by letter to the drawings, A indicates each of a pair of split-grips that are for the most part of preferably elliptical form and fastened, by a set-screw $b$ or otherwise, to an arbor B for which a head C is provided with bearings $c$, a shank $d$ of this head being in oscillative connection with a section D of a jointed bracket. At the split, each grip is provided with a ledge $e$, upon which to rest a skate-runner, and also a bearing $f$ for a binding screw E opposed to said runner.

The grips, binding-screws, arbor and head above specified constitute the clamp element of the mechanism herein set forth, and to limit rock of said arbor and grips in one direction, said head is provided with an arm $g$ constituting a bearing for a stop-screw $h$ in opposition to one of the aforesaid grips.

The jointed bracket is one suitable form of a variable radius carrier, and a section F thereof is in oscillative connection with a butt G having a pivot-shank $i$ held by a set-screw $j$ in a stud $k$ of a plate H, which plate has alined slots $m$ thereof engaged by binding-screws $n$ engaging another plate I that is attachable by bolts or other suitable means to a wall, post or other suitable support, a fine adjustment of the plate first aforesaid being determined by an opposing screw $o$ engaging a lug $p$ of the other plate, and this adjusting screw has a set-nut $q$ run thereon in opposition to said lug. The adjustment of the plate H, longitudinally of the plate I, and the pivotal adjustment of the oscillative jointed bracket determines the proper alinement of a clamped skate-runner with relation to a grinding-wheel so as to present said runner to said wheel parallel to the axis of same, the clamp and said bracket being manipulated to suit the operator during a grinding operation.

I claim:

1. An oscillative expansile and contractile radius carrier attachable to a suitable support, a head in oscillative connection with the carrier, and skate-runner clamp grips in rocking connection with the head.

2. An oscillative expansile and contractile radius carrier attachable to a suitable support, a head in oscillative connection with the carrier, skate-runner clamp-grips in rocking connection with the head, and means limiting the rock of the grips in one direction.

3. An oscillative pivotally adjustable expansile and contractile radius carrier adjustable on a plane parallel to a suitable support to which it is attachable, a head in oscillative connection with the carrier, an arbor mounted to turn in the head and skate-runner clamp-grips fast on the arbor.

4. A skate-runner clamp comprising split-grips having opposing runner-supporting ledges and binding screws at the splits thereof, and an oscillative expansile and contractile radius carrier for the clamp attachable to a suitable support.

5. An expansile and contractile bracket attachable to a suitable support, a head in oscillative connection with the bracket, skate-runner clamp-grips in rocking connection with the head, and means also in connection with said head for limiting rock of the grips in one direction.

6. An expansile and contractile radius carrier in pivotally adjustable connection with a support, means for holding the carrier in its pivotally adjusted position, and a skate runner clamp in connection with said carrier.

7. An expansile and contractile radius carrier, a plate vertically adjustable in connection with a support, means for holding the plate in adjusted position, means for holding the carrier in pivotally adjusted connection with said plate, and a skate-runner clamp in connection with said carrier.

In testimony that I claim the foregoing I have hereunto set my hand at Milwaukee in the county of Milwaukee and State of Wisconsin in the presence of two witnesses.

JAMES M. THOMPSON.

Witnesses:
GEORGE FELBER,
N. E. OLIPHANT.